June 30, 1942. J. H. GETTIG ET AL 2,288,086
APPARATUS FOR FORMING AN AXLE HOUSING
Filed June 29, 1940 4 Sheets-Sheet 1

INVENTORS
GEORGE SPATTA-JOSEPH GETTIG
BY Walter E. Skinner
ATTORNEY.

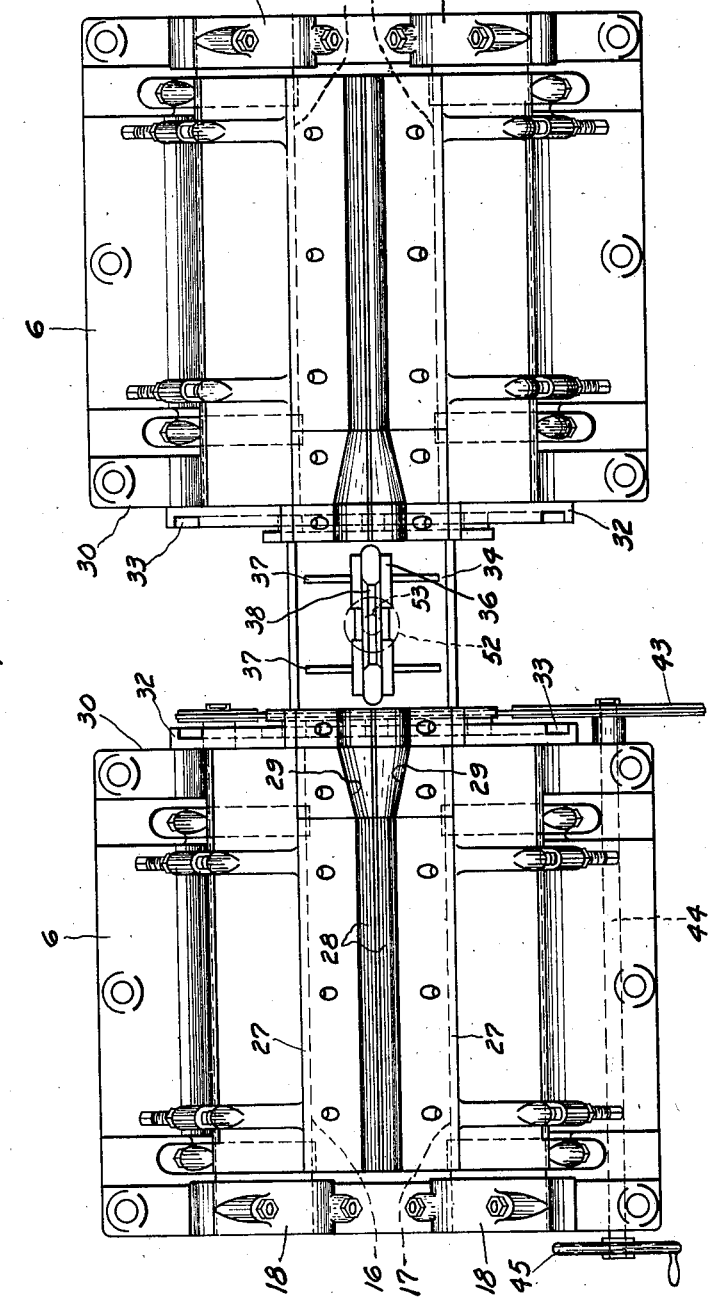

June 30, 1942.  J. H. GETTIG ET AL  2,288,086
APPARATUS FOR FORMING AN AXLE HOUSING
Filed June 29, 1940  4 Sheets-Sheet 3
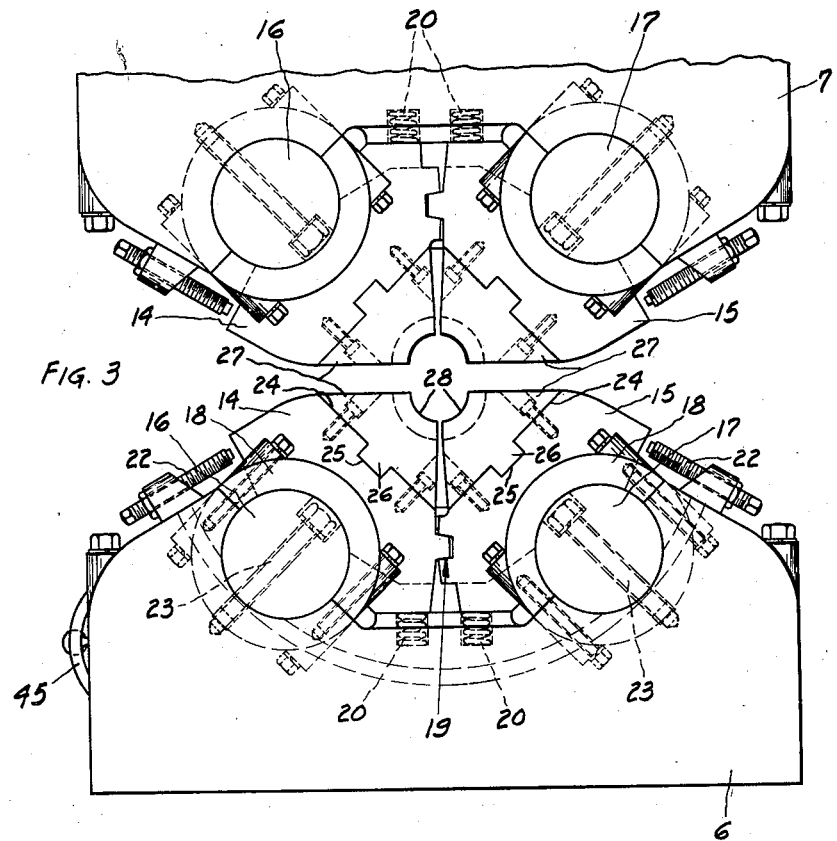
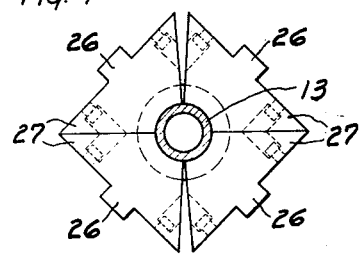
INVENTORS
GEORGE SPATTA - JOSEPH GETTIG
BY Walter E. Schirmer
ATTORNEY June 30, 1942.  J. H. GETTIG ET AL  2,288,086
APPARATUS FOR FORMING AN AXLE HOUSING
Filed June 29, 1940   4 Sheets-Sheet 4

INVENTORS
GEORGE SPATTA - JOSEPH GETTIG
BY Walter E. Schirmer
ATTORNEY

Patented June 30, 1942

2,288,086

UNITED STATES PATENT OFFICE 2,288,086

APPARATUS FOR FORMING AXLE HOUSINGS

Joseph H. Gettig and George Spatta, Buchanan, Mich., assignors to Clark Equipment Company, Buchanan, Mich., a corporation of Michigan Application June 29, 1940, Serial No. 343,120

11 Claims. (Cl. 153—48)

This invention relates to an apparatus for forming an axle housing.

In developing a one-piece forged banjo type rear axle housing having an expanded slotted center portion, it has been customary heretofore to roll up a tubular blank from flat sheet stock and weld the same to provide the tubular blank. This welding operation is disclosed in detail in the patent to Gettig and Spatta, No. 2,160,586, issued May 30, 1939. After the blank has been welded, it is subjected to a slotting operation forming opposed substantially oval slots adjacent the longitudinal center of the blank. This slotting operation is shown in the patent to Spatta, No. 1,895,589, issued January 31, 1933.

The housing is then subjected to a heat treatment to remove the strains introduced in the welding operation, and is passed to a skip roll which provides for reducing the arms on opposite sides of the slotted portion. This skip roll operation is shown in detail in the patent to Gettig, No. 2,165,543, issued July 11, 1939.

In the commercial manufacture of housings according to these processes, it has been found that the skip roll does not produce an extremely accurate arm formation in that the arms may be out of longitudinal alinement with each other to a slight extent and may not be perfectly round. The present invention concerns itself with the provision of apparatus for straightening the arms and insuring their perfect circular section after the blanks leave the roll forging machine and prior to their introduction into the furnace, wherein they are heated in their central portion to provide for expanding of the central portion into the banjo frame.

The present invention contemplates broadly the provision of a straightening die in which the blanks are introduced from the roll forging machine, which die has suitable means for indexing the blanks to provide for true alinement of the oppositely extending arms and proper circular cross section in the arms. The machine also provides for engaging the arms in the die in several relatively rotated positions to insure proper circularity, and also to provide for the proper merging of the throat portion of the blank with the arm portions. This indexing operation is of distinctly novel form and includes as a part thereof, means for discharging the blank, after it has been die pressed, onto a suitable rack, whereby it may be automatically discharged into the conveyor leading to the furnace.

An important feature of the present invention is to so locate the straightening die that it will operate upon the blanks while they still retain some of the heat from the heat treating process to which they are subjected prior to being introduced into the roll forging machine. The retention of this heat is of distinct advantage as the relatively hot blank is then discharged immediately into the furnace for heating the central portion prior to the expanding operation, and consequently effects a considerable saving in the amount of heat necessary as well as in the length of time that the blank must remain in the furnace.

Another object of the present invention resides in the provision of a novel trunnioned die structure in the straightening machine, insuring perfect alinement of the dies so that the blank is subjected to the proper straightening action. Still another feature of the present invention resides in the provision of a machine in which the blanks can be introduced and located on the machine without the necessity of being handled by the operator, and can be properly indexed automatically. In this connection, a power operated key is provided for introduction into the opposed slots in the central portion of the blank, this key being so mounted that it can be rotated by the operator to provide for rotation of the blank in the die.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 2 is a top plan view of the lower die member;

Figure 3 is an elevational view of the die structure with the movable die spaced slightly away from the bead die;

Figure 4 is a detailed diagrammatic view showing how the dies operate upon the arm of the blank when in closed position.

Figure 1:
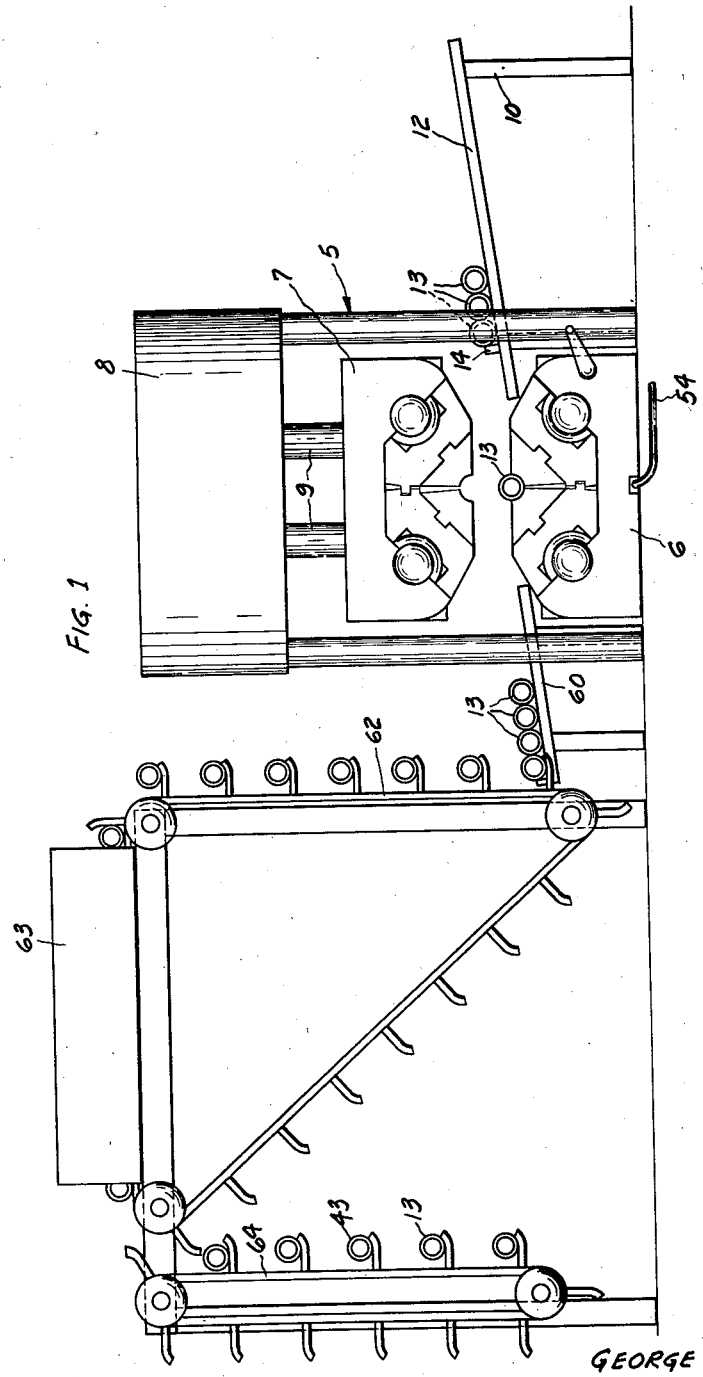
Figure 1 is an elevational view, more or less diagrammatically illustrating the set-up of the machine in relation to the remaining operating steps in forming the completed housing.

Referring now in detail to the drawings, in Figure 1 we have disclosed the straightening machine, indicated generally at 5, including the bed die frame 6, the movable die head 7, and the pressure head 8, the die head 7 having suitable pistons or guides 9 whereby it is guided for vertical reciprocatory movement from the head 8. It is understood that the head 8 is provided with suitable hydraulic means for controlling the movement of the head 7 and is operated in any suitable manner. The press or machine is of a type such as to provide for 1,000 to 1,500 tons pressure upon the blank when it is placed between the die heads 6 and 7. Leading laterally into the die 6 is a rack 10 having the inclined track 12 thereon down which the blanks 13 are discharged from the roll forging machine. A suitable stop 14 is provided for restraining the blanks, this stop being controlled by means of a pedal or the like (not shown) to release one of the blanks for movement onto the surface of the die 6 and into the position shown in Figure 1. Each of the dies 6 and 7 comprises laterally spaced die frames, and, as seen in Figure 2, the die frames 6 are spaced apart a distance such as to receive the central portion of the blank therein. The die holders 14 and 15, as shown clearly in Figure 3, are adapted to be trunnioned at opposite ends upon parallelly extending shafts 16 and 17 which form pivots therefor, the shafts being secured to the bed die 6 by means of the bearing cap portions 18. This allows relative rocking movement of the die holders 14 and 15 relative to the shafts 16 and 17. To provide for coordinated movement of the die holders 14 and 15, they are provided with intermeshing lugs or teeth 19, whereby rocking movement of one of the die holders results in imparting the same rocking movement to the other die holder. Suitable heavy coil springs 20 engage the adjacent lower ends of the die holders 14 and 15, and tend to urge them outwardly away from each other, there being suitable adjustable stops 22 on the bed die 6 for limiting such movement. The shafts 16 and 17 are secured against rotation relative to the bed frame 6 by means of angularly extending studs 23, whereby the die holders rotate about the surface of these shafts.

It will be noted that each of the die holders 14 and 15 has an inclined surface 24 provided with a longitudinally extending recess 25 in which is disposed the tongue 26 of a die member 27 seated upon this surface. The dies 27 are provided with die surfaces 28 which are in the form of quadrants of a circle, which quadrants are enlarged toward the adjacent ends of the die frames to provide the throat die surfaces 29. It will be apparent that upon downward pressure of the upper die head 7, the die holders 14 and 15 will have a tendency to rotate toward each other against the pressure of springs 20, thereby bringing the die surfaces 28 toward each other to close the small gap produced therebetween by the springs 20 when in inoperative position. The upper end die head 7 is provided with die holders and dies in the same manner, and corresponding reference numerals have been applied thereto. These die holders 14 and 15 of the die frame 7 are also rotatable about shafts 16 and 17 to provide for conjoint relative rotation of the dies upon pressure engagement upon a blank interposed therebetween. The dies 27 are held in position on the surfaces of the die holders 14 and 15 by means of recessed studs in any suitable or conventional manner.

Figure 5:
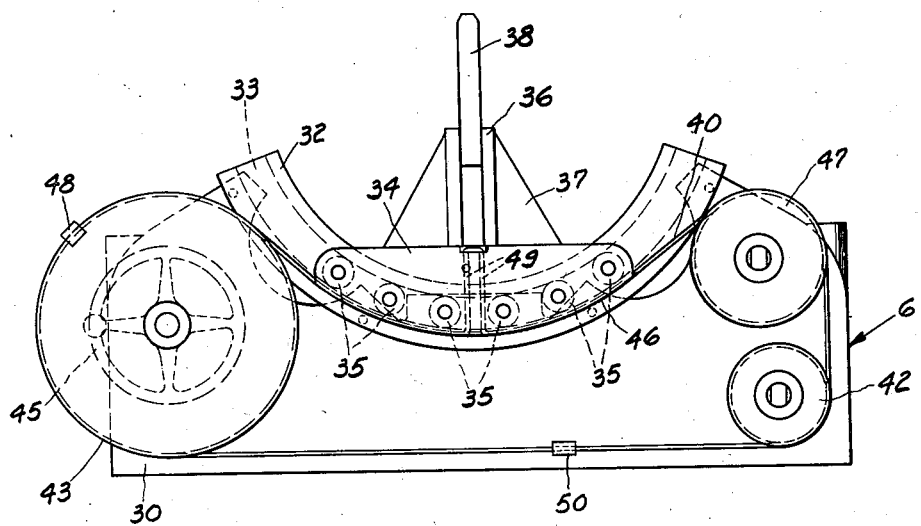
Figure 5 is an elevational view of the indexing and key arrangement for locating the blank in the die and rotating the same in successive die pieces.

The two vertical facing surfaces 30 of the adjacent ends of the die frames 6 are provided with arcuate track members 32 bolted or otherwise secured to these faces and having therein a channel-shaped arcuate trackway 33. Mounted in this trackway by means of suitable rollers is an indexing frame member 34 which, as shown more clearly in Figure 5, has a plurality of rollers 35 adapted to project from the sides thereof and disposed for rolling engagement in the trackway 33, the rollers being set on an arc corresponding to the arcuate path of the trackway. The member 34 is provided with a vertically extending portion or key guide 36 suitably reinforced laterally by the ribs 37, which guide is adapted to have mounted therein the key member 38 having a beveled upper end adapted to enter in the slots in the blank.

Mounted on the face of the left hand die frame 6, shown in Figure 2, are a plurality of pulleys 40, 42 and 43. The pulley 43 is mounted upon a shaft which extends longitudinally through the die frame 6, as indicated at 44, and at its outer end is provided with a crank or hand wheel 45 easily accessible by the operator. Lying outside of the surface of the member 32, the indexing member 34 is provided with an arcuate surface 46 having an external groove in which is trained a wire cable 47, which cable in turn extends over the pulleys 40 and 42 and is secured against rotation relative to the pulley 43 by means of the locking member 48. The member 34 has two pulley receiving portions provided with a recess through which the cable is inserted, as indicated at 49, whereby the cable is firmly locked against relative movement with respect to the member 34. The two ends of the cable are spliced together, as indicated at 50.

In the operation of this mechanism, rotation of the hand wheel or crank 45 results in moving the cable over the pulleys, and consequently imparts rocking movement to the member 34 along the trackways 33. The center of rotation of this rocking movement and of the trackway 33 is located coincident with the center of the surfaces forming the arcuate die surfaces 28 of the lower die head 6 so that the indexing movement results in rotation of the blank about its axis into various inclined positions insofar as the key 38 is concerned.

To operate the key for engaging the blank so that it is locked to the indexing member 34 for rocking movement therewith, we provide a hydraulic cylinder 52 which has a piston rod 53 therein connected at its upper end to the lower end of the key 36. The cylinder is connected to a suitable source of hydraulic pressure through a conduit 54, and a suitable control means, such as a valve or the like, is operative to raise the piston for raising the key 38 into and through the slots in the blank, or for lowering this key after the blank has been straightened.

In the operation of the mechanism thus far described, the blank is allowed to roll from the rack or track 12 into the arcuate groove or recess formed by the cooperating die surfaces 28 and 29 formed in the lower die head 6. Preferably, the distance between the stop 14 and the die recess is so arranged that when the blank rolls into position, the slots will be in vertical alinement. The operator then actuates the piston 53, raising the key up through these slots to thereby support the blank for conjoint rotation with the indexing member 34. The upper die head is then moved downwardly, engaging the upper dies 27 over the blank and pressing downwardly to move the dies relatively toward each other into the position shown in Figure 4. This results in applying a true radial squeeze to all portions of the arms and throat of the blank, moving the two arms into longitudinal axial alinement and at the same time swaging them into true circular section. The upper die head is then raised, the indexing member 34 actuated through the hand wheel 43 to an angular position, and the upper die head again moved downwardly to produce another squeeze upon the blank. The upper die head is then again raised and the indexing member moved into an oppositely inclined position to insure that a true circular cross section will be effected in both of the arm portions of the blank. With the indexing member in such inclined position, the operator actuates the piston 53 to withdraw the key downwardly out of engagement with the blank. With the blank then supported solely by resting on the die surfaces 28 and 29 of the lower die head 6, the indexing means is rotated into a position such that when the key is again raised through the piston 53 it will abut against the blank and force it outwardly of the recess toward the inclined rack 60 disposed at the opposite side of the machine. The blank then rolls down this rack and is picked up by the vertical portion of the conveyor 62 and carried upwardly and into the furnace 63, wherein the center portion of the blank which has been disposed between the die heads 6 is heated as it moves laterally through the furnace and is discharged at the other end by the conveyor 62 onto a second conveyor 64 which carries it downwardly and discharges it at the lower end in condition suitable for the expanding operation. This latter operation is described in detail in the patents to Spatta, Nos. 1,958,214 and 1,958,215, issued May 8, 1934.

It will thus be apparent that the indexing member and key are used not only for rotating the blank to allow it to be subjected to the die pressure in various of the relatively rotated positions, but is also employed to push the blank out of the die recess and thereby roll it over to the discharge rack of the machine.

By properly correlating the movement of the two die holders 14 and 15 of each of the die heads by intermeshing toothed engagement therebetween, it is possible to insure that uniform radially inwardly directed pressure is exerted on all lateral surfaces of the blank during the forming operation. This insures perfect concentricity of the arms, as well as longitudinal alinement thereof. The dies and die holders are constructed so that they may be readily removed or replaced when desired to accommodate various sizes and lengths of blanks.

With such a construction, the heat in the blank after it leaves the heat treating furnace and the roll forging machine is sufficient to retain it in a somewhat plastic condition during the straightening operation, and a certain portion of this heat is maintained as the blank is discharged and moved into the furnace 63, thereby requiring less heating in the furnace. Furthermore, the fact that the facing surfaces of the dies 27 on the upper and lower die heads are moved into substantial squeezing engagement serves to close the longitudinal gaps between the dies 27 carried by each of the die heads, this insures that there will be little or no flash formed on the blank, and whatever flash might be formed is removed due to the fact that the blank is squeezed in several rotated positions.

The control of the indexing member and locking key is simple and rapid, and consequently a single operator can straighten the blanks in such a machine without being required to lift the blanks manually in any manner, and can control discharge of the blanks so that at no time need the blanks be handled by hand during the straightening operation.

We are aware that various changes may be made in details of the die construction and indexing means without in any manner departing from the underlying principles of the present disclosure, and we therefore do not intend to be limited except as defined by the scope and spirit of the appended claims.

We claim:

1. In combination, a pair of longitudinally spaced die beds, dies rotatably trunnioned thereon and having complementary die surfaces interlocked for coordinated movement, a second pair of spaced die beds having corresponding dies thereon movable toward and away from said first dies to press an axle housing blank therebetween, and indexing means between said die beds for receiving said blank and operable from one end of said die beds for rotating said blank relative to said dies intermediate pressing operations thereon.

2. Means for straightening the arms and throat portion of a rear axle housing blank comprising relatively movable upper and lower pairs of cooperating die members for receiving the blank therebetween, each pair of said die members being geared for conjoint relative pivotal movement, indexing means engageable with said blank and rotatably supported adjacent the lower die members, a key carried by said indexing means engageable with said blank for locking it for conjoint rotation with said indexing means, and remotely disposed means for actuating said indexing means.

3. Means for straightening the arms and throat portions of a rear axle housing blank comprising a bed die frame having spaced parallel shafts secured thereto, a pair of die members each trunnioned on one of said shafts, interlocking means between said die members providing for conjoint rotation thereof on said shafts, said members having arcuate die surfaces forming a generally semi-cylindrical recess, a movable die frame having corresponding interlocked die members with corresponding die surfaces adapted to define, with said first-named die surfaces, a cylindrical die opening, and means engageable upon relative movement of said die frames toward each other for effecting conjoint rotation of each pair of die members.

4. Means for straightening the arms of a tubular banjo type axle housing blank comprising cooperating die means for receiving each of said arms of said blank and having a space therebetween, an indexing member mounted for arcuate movement in said space, a key in said member adapted in operative position to lock said blank for rotation with said member, hydraulic means carried by said member for actuating said key, and means for actuating said indexing member from one end of said die means.

5. Means for straightening the arms of a tubular axle housing comprising longitudinally spaced cooperating dies for receiving and swaging said arms, means rotatably mounted intermediate said dies for engaging the center of said blank to rotate it relative to said dies between successive swaging thereof, means for actuating said blank rotating means, and means in said rotating means operable to discharge said blank from said dies.

6. In combination, in apparatus for straightening the arms of a tubular axle housing, a lower die frame including longitudinally spaced pairs of trunnion mounted dies, each pair having complementary die surfaces and interlocked for conjoint movement, an upper die frame having corresponding pairs of interlocked dies movable toward said lower frame to bring said dies all into pressure engagement about the arms of said blank, rotatable means between the dies on the lower frame for engaging the center of the blank to rotate it about its longitudinal axis, said means being operable to discharge said blank from said apparatus, and means for actuating said rotatable means from a remote point.

7. Indexing means for engaging the slotted center of a tubular axle housing blank comprising a pair of spaced arcuate trackways, a rocking member having means guiding it for movement in said trackways, a key mounted in said member, pneumatically operated means for projecting said key from said member into the slots to lock said blank for conjoint movement with said member, and means for rocking said member on said trackways operable from a remote point.

8. Means for straightening the oppositely extending arms of a tubular housing blank comprising a pair of longitudinally spaced lower die beds each having trunnioned pairs of interlocking die members having complementary die surfaces forming a semi-cylindrical arm-receiving recess, a corresponding pair of upper die frames each having corresponding sets of die members and movable downwardly about the arms in said lower die members to completely enclose the same and apply radially inwardly directed pressure thereto, said die members each having relative movement about the trunnion support thereof during the application of pressure to said blank.

9. In apparatus for forming axle housings from tubular blanks, a die mechanism for straightening the arms of said blank, means for delivering blanks to said mechanism, and means in said mechanism engaging the blank intermediate its ends for rocking it about its longitudinal axis between die operations thereon, said means including a reciprocatory member operable to discharge said blank from said die mechanism upon completion of the straightening operation.

10. In an apparatus for forming an axle housing, a pair of longitudinally spaced upper and lower die members for engaging the arms of said blank, arcuate trackways intermediate the lower die members, a rocking member mounted in said trackways for movement in a transverse arc, and means in said rocking member engageable with the center portion of said blank for rocking said blank therewith whereby said blank may be rocked into different angular positions intermediate successive die operations.

11. Means for straightening the oppositely extending arms of a tubular housing blank comprising a pair of longitudinally spaced lower die beds each having trunnioned pairs of die members having complementary die surfaces forming a semi-cylindrical arm receiving recess, a corresponding pair of upper die frames having corresponding sets of die members, means interlocking each pair of die members for uniform movement toward and away from each other, means normally urging the die members of each pair away from each other, and means for moving the upper die frames downwardly so that the upper die members abut the lower die members and simultaneously said die members of each pair move toward each other.

GEORGE SPATTA.
JOSEPH H. GETTIG.